May 15, 1962 W. J. BIEGANSKI ET AL 3,034,356

BALANCED PRESSURE TRANSDUCERS

Filed May 6, 1958

INVENTORS
Wladyslaw J. Bieganski
& Albert L. Witchey
BY
ATTORNEY

Patented May 15, 1962

3,034,356
BALANCED PRESSURE TRANSDUCERS
Wladyslaw J. Bieganski, Fords, and Albert L. Witchey, Erlton, N.J., assignors to Radio Corporation of America, a corporation of Delaware
Filed May 6, 1958, Ser. No. 733,443
8 Claims. (Cl. 73—398)

This invention relates to transducers, and more particularly to transducers that are substantially insensitive to gravity regardless of their positions in a pressure system. The transducers of the present invention are particularly useful as passive pills for continuously telemetering the gastrointestinal pressure of a living subject.

It had been proposed to telemeter the gastrointestinal pressure of a living subject by a "radio pill" that was swallowed by the subject, for example, a living person, to be tested. The prior art "radio pill" comprised a miniature transmitter including a battery, an antenna, an oscillator circuit, and means to change the frequency of the oscillator circuit by varying the inductance of a coil in the oscillator circuit. The inductance of the coil was varied by means of a diaphragm which caused a slab of magnetic material to move toward or away from the coil in accordance with changes in the pressure applied to the diaphragm. Thus, the "radio pill" transmitted a signal that was modulated as a function of the pressure on the diaphragm.

While the "radio pill" has been used successfully, its operability was limited by the amount of energy that was stored in its very small battery. It has been found, also, that gravity could cause an error in the gastrointestinal pressure telemetered by the "radio pill" depending upon the orientation of the "radio pill" within the body. Also, since the "radio pill" was a miniature radio transmitter, it was difficult to make it sufficiently small so that it could be tolerated easily by many people, when swallowed.

Accordingly, it is an object of the present invention to provide an improved transducer for telemetering gastrointestinal pressures that will greatly minimize or eliminate the disadvantages of the prior art "radio pill."

It is another object of the present invention to provide an improved pressure transducer that is relatively insensitive to the force of gravity alone regardless of its orientation with respect to the gravitational field.

Still another object of the present invention is to provide an improved balanced pressure transducer for telemetering fluid pressure in the presence of solid particles.

A further object of the present invention is to provide an improved balanced pressure transducer of the type adapted continuously to telemeter the gastrointestinal pressure of a living subject.

Still a further object of the present invention is to provide an improved balanced pressure transducer of the type that may be used to telemeter the gastrointestinal pressure of a living subject, but which contains relatively fewer components than the prior art transducers, whereby it may be made smaller.

Still a further object of the present invention is to provide an improved balanced pressure transducer for measuring gastrointestinal pressure that does not required a battery or an antenna.

Still a further object of the present invention is to provide an improved balanced pressure transducer that is relatively simple in operation and construction, and yet is highly efficient in use.

In accordance with the present invention, the foregoing objects and related advantages are attained in an improved pressure transducer including features that compensate for pressure indications that are caused solely by gravity. The transducer comprises a coil fixed within a body of insulating material. The body is formed with a through opening, coaxially disposed with respect to the coil. A core of magnetic material is fixed within the coil and disposed within the through opening. A separate slab of magnetic material is disposed on each side of the core and spaced therefrom. Each slab is fixed to a resilient member that, in turn, has its peripheral edges fixed to the body in a manner whereby it can act as a diaphragm sensitive to pressures thereon. Each of the resilient members may be protected by a resilient diaphragm spaced from it and extending across the through opening. The resilient members may be protected by a cover formed with one or more holes therein, and the resilient diaphragms may be on either side of the cover.

The novel features of the present invention, as well as the invention itself, both as to its organization and methods of operation will be understood in detail when considered in connection with the accompanying drawing in which, similar reference characters represent similar parts, and in which.

Figure 1:
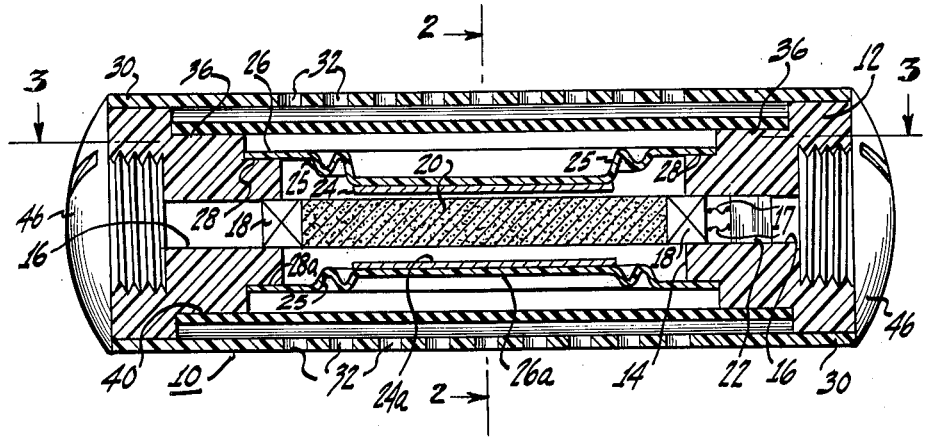
FIG. 1 is a side elevational view, in cross-section, of the balanced pressure transducer in accordance with the present invention.
Figure 2:
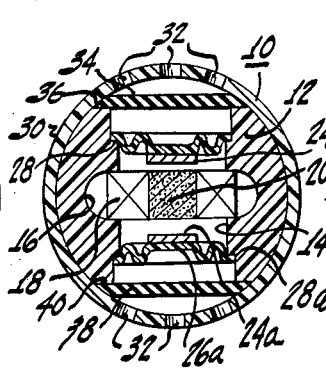
FIG. 2 is a cross-sectional view of the balanced pressure transducer taken along the plane 2—2 in FIG. 1, and viewed in the direction indicated by the arrows.
Figure 3:
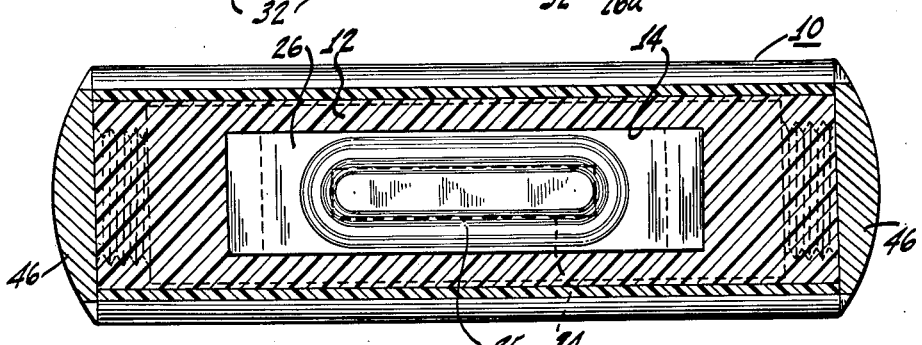
FIG. 3 is a cross-sectional view of the pressure transducer taken along the plane 3—3 in FIG. 1, and viewed in the direction indicated by the arrows.

Referring now to FIGS. 1, 2, and 3, there is shown a transducer 10 in the form of a pill that may be comfortably swallowed by a person for the purpose of telemetering his gastrointestinal pressure continuously. The transducer 10 comprises a body 12 of electrically insulating material, such as the plastic "Textolite." The body 12 may be a length of plastic rod formed with a uniform through opening 14 between the ends of the body 12 and passing laterally through the longitudinal axis thereof, as shown by FIG. 2. The body 12 is also formed with a slot 16 that extends along the longitudinal axis of the body 12 and communicates with the through opening 14. The slot 16 is wider than the through opening 14 to form a longitudinal recess in the wall of the body 12 that defines the through opening 14.

A coil 18 of wire is disposed within the slot 16 in the body 12 in a manner to be coaxially disposed within the through opening 14. Litz wire is preferred to obtain a high Q for the coil 18. The coil 18 may be held within the body 12 by friction, or by any suitable adhesive. A core 20 of magnetic material, such, for example, as ferrite material, is fixed within the coil by any suitable means. The ends 17 of the coil 18 are connected to the terminals of a capacitor 22 to provide a resonant circuit. The capacitor 22 may be fixed within the slot 16 adjacent one end of the body 12 by friction, or any other suitable means.

Means are provided to vary the frequency of the resonant circuit comprising the coil 18 and the capacitor 22. To this end, a slab of ferrite material 24 is spaced from one side of the core 20. The ferrite slab 24 may be fixed, by any suitable means, to a resilient member 26 which may be a thin sheet of polystyrene plastic, such as "Mylar." The resilient member 26 may have its resiliency increased by corrugations, formed by any known process, in the vicinity of the ferrite slab 24, as at 25. The resilient member 26 is stretched across the through opening 14 and its peripheral edges are fixed, by an air-tight seal, to a ledge 28 in the body 12.

A slab of ferrite material 24a is fixed, by any suitable means, to a resilient member 26a, which in turn, is cemented, by an air-tight seal, to a ledge 28a in the body 12. The ferrite slab 24a and the resilient member 26a are similar to the ferrite slab 24 and the resilient member 26, and are disposed in a manner symmetrical to the ferrite slab 24 and the resilient member 26 with respect to the ferrite core 20.

It will now be understood that the pressure applied to the resilient members 26 and 26a will cause the ferrite slabs 24 and 24a to move toward the core 20. This will increase the inductance of the coil 18. It will also be understood that any change in the inductance of the coil 18 will cause the resonant frequency of the resonant circuit comprising the coil 18 and the capacitor 22 to vary.

Since the transducer 10 is adapted to be swallowed as a pill, means are provided to prevent solid food particles and liquids within the body from abnormally affecting the ambient pressure to be sensed by the transducer 10. To this end, the transducer 10 may be provided with a rigid cover 30, tubular in shape, and adapted to fit tightly over the body 12. The cover 30 may be made of any suitable plastic and should be formed with a plurality of holes 32 therein. The holes 32 should be disposed opposite to the resilient members 26 and 26a so that the pressure outside of the transducer 10 may be transmitted to the resilient members 26 and 26a.

Where it is desired to exclude liquids and small solid particles from coming in contact with the resilient members 26 and 26a, a resilient plastic diaphragm, such as a sheet of rubber latex, for example, may be disposed between the cover 30 and each of the resilient members 26 and 26a. A resilient diaphragm 34, for example, is disposed between the resilient member 26 and the cover 30. The diaphragm 34 has its peripheral edges fixed, by any suitable means, in an air-tight seal, to a recessed ledge 36 in the body 12 that defines a portion of the through opening 14. Similarly, a resilient diaphragm 38, disposed between the resilient member 26a and the cover 30, has its peripheral edges fixed, in an air-tight seal, to a recessed ledge 40 in the body 12, by any suitable means. It will now be understood that the pressures to be sensed by the transducer 10 will be transmitted to the resilient members 26 and 26a by means of these pressures on the diaphragms 34 and 38.

Figure 4:
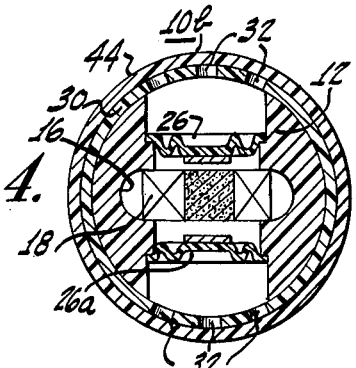
FIG. 4 is a cross-sectional view, similar to FIG. 2, showing a modification of the present invention.

Referring now to FIG. 4, there is shown a transducer 10b substantially similar to the transducer 10 shown in FIGS. 1, 2, and 3. The transducer 10b, however, differs from the transducer 10 in that a resilient plastic diaphragm 44 is stretched over the cover 30, thereby obviating the need for the diaphragms 34 and 38 as in the transducer 10. Pressures external to the transducer 10b are communicated to the resilient members 26 and 26a via the resilient diaphragm 44.

In cases where rubber diaphragms are not desirable because they may be attacked by body acids, the diaphragm 44 may be made of polyethylene or "Teflon." These plastic diaphragms need be only about 0.001 inch in thickness and may be heat sealed or tied around the pill 10b. These thin diaphragms should offer no significant impedance to pressure variations in the range encountered in gastrointestinal tracts, are disposable, keep the pill sanitary, and facilitate the cleaning of the pill.

The slot 16, in the body 12, may be plugged at its ends by any suitable means in order to prevent body fluids and particles from entering therein. Plastic caps 46, in the form of screws, may be screwed into tapped holes in the ends of the body 12 for this purpose. With such an arrangement, the components of the transducer 10 may be serviced and/or replaced easily.

The operation of the transducer 10 will now be described. The transducer 10 is swallowed as a pill by a person whose gastrointestinal pressures are to be measured. Since it has been found that the gastrointestinal pressure will vary in different portions of the gastrointestinal tract, the pressures exerted on the diaphragms 34 and 38 will be sensed by the resilient members 26 and 26a and cause them to move the ferrite slabs 24 and 24a. An increase in the gastrointestinal pressure will, for example, cause the ferrite slabs 24 and 24a to move closer to the core 20, and a decrease in the gastrointestinal pressure will cause the ferrite slabs 24 and 24a to move away from the core 20. In this manner, the inductance of the coil 18 is varied, and, as explained before, such variations cause proportional variations in the resonant frequency of the resonant circuit comprising the coil 18 and the capacitor 22 connected thereacross. The transducer 10 may be followed in the person by X-ray photography or fluoroscopic means.

The transducer 10b, shown in FIG. 4, operates substantially in the same manner described for the transducer 10. Pressures within the body of a person, exerted upon the resilient diaphragm 44, cause the ferrite slabs 24 and 24a to change the inductance of the coil 18, whereby to vary the resonant frequency of the resonant circuit of which it is a part.

The frequency of the resonant circuit comprising the coil 18 and the capacitor 22 may be detected by apparatus utilizing an energy absorption effect which occurs when the resonant frequency of a detector oscillator is equal to the instantaneous resonant frequency of the resonant circuit of the transducer. Novel apparatus for detecting the instantaneous resonant frequency of the transducers 10 and 10b, for example, has been described in a copending patent application, Serial No. 733,444, filed on May 6, 1958, in the United States Patent Office, by Wladyslaw J. Bieganski.

Thus, there has been shown and described, in accordance with the objects of the present invention, balanced pressure transducers that are substantially insensitive to gravity. The transducers 10 and 10b are shown in positions permitting a maximum displacement of the ferrite slabs 24 and 24a due to the earth's gravitational pull. It will be understood that as the gap between the slab 24 and the core 20 is decreased, by gravity, the gap between the slab 24a and the core 20 is increased proportionally, by gravity. By actual laboratory measurement, the inductance of the coil 18 has been maintained substantially constant over a considerably wider range of gravitational displacement than that demanded by the pressure signal. Hence the residual inductance, and the resulting resonant frequency are not affected by the pull of gravity on the transducers.

What is claimed is:

1. In a transducer of the type comprising a body formed with a through opening, a coil fixed to the portion of said body adjacent to said through opening, and a capacitor connected to said coil to provide a resonant circuit therewith, said resonant circuit being within said body, the combination with said resonant circuit of means to vary the inductance of said coil comprising a pair of resilient diaphragms, said resilient diaphragms being fixed to said body on opposite sides of said coil to form a closed chamber including said coil between said resilient diaphragms, and a separate slab of magnetic material fixed to each of said resilient diaphragms and movable therewith.

2. In a transducer of the type comprising a body formed with a through opening, a coil fixed to the portion of said body adjacent to said through opening, and a capacitor connected to said coil to provide a resonant circuit therewith, said resonant circuit being within said body, the combination therewith of a pair of resilient diaphragms, said resilient diaphragms being fixed to said body on opposite sides of said coil to form a closed chamber including said coil between said resilient diaphragms, a separate slab of magnetic material fixed to each resilient diaphragm between said coil and each of said resilient diaphragms, and a cover for said transducer covering at least the ends of said through opening and being spaced from said resilient diaphragms, said cover being formed with holes opposite each of said resilient diaphragms to permit ambient pressure to be transmitted to said resilient diaphragms.

3. In a transducer of the type comprising a body formed with a through opening, a coil fixed to the portion of said body adjacent to said through opening, and a capacitor connected to said coil to provide a resonant circuit therewith, the combination therewith of a pair of resilient diaphragms, said resilient diaphragms being fixed to said body on opposite sides of said coil to form a closed chamber including said coil between said resilient diaphragms, a separate slab of magnetic material fixed to each resilient diaphragm between said coil and each of said resilient diaphragms, a perforated cover for said transducer covering at least the ends of said through opening and being spaced from each of said resilient diaphragms and permitting ambient pressure to be transmitted through said cover, and a separate resilient diaphragm fixed to said body between said cover and each of said resilient diaphragms.

4. In a transducer of the type comprising a body formed with a through opening, a coil mounted within the portion of said body defining said through opening, and a capacitor connected to said coil to provide a resonant circuit therewith, the combination therewith of a pair of resilient diaphragms, said diaphragms being fixed to said body on opposite sides of said coil to form a closed chamber including said coil between said resilient diaphragms, a separate slab of magnetic material fixed to each resilient diaphragm between said coil and each of said resilient diaphragms, a perforated cover for said transducer covering at least the ends of said through opening and being spaced from each of said resilient diaphragms and permitting ambient pressure to be transmitted through said cover, and a resilient diaphragm over said cover and covering said perforations in said cover.

5. A transducer comprising a body, said body being formed with a through opening spaced from opposite ends of said body, a coil fixed within said body in a portion of said body adjacent to said through opening, a core of magnetic material fixed within said coil, a pair of slabs of magnetic material, a separate resilient diaphgram fixed to each of said slabs of said pair, means fixing the peripheries of said resilient diaphragms to said body and supporting said slabs substantially parallel to each other on opposite sides of said core, a capacitor fixed within said body and connected across said coil to form a resonant circuit therewith, and a diaphragm surrounding at least a portion of said body and covering said through opening.

6. A transducer comprising an elongated body of electrically insulating material, said body being formed with a through opening spaced from opposite ends of said body and passing through the axis of said body, a coil fixed within a portion of said body adjacent to said opening, a core of magnetic material fixed within said coil, a pair of slabs of magnetic material, a separate resilient diaphragm fixed to each of said slabs of said pair, means fixing the peripheries of said resilient diaphragms to said body for supporting said slabs substantially parallel to each other on opposite sides of said core, and a capacitor within said body and connected across said coil to form a resonant circuit therewith.

7. A transducer comprising an elongated body of electrically insulating material, said body being formed with a through opening spaced from opposite ends of said body and passing through the axis of said body, said body being formed with an axially aligned slot passing through at least one of said ends and communicating with said through opening, a coil fixed within said slot and disposed coaxially with said opening, a core of magnetic material fixed within said coil, a pair of slabs of magnetic material, a separate resilient diaphragm fixed to each of said slabs of said pair and to said body by a gas-tight seal for supporting said slabs substantially parallel to each other on opposite sides of said core and forming a closed chamber between said diaphragms, a capacitor within said slot and connected across said coil to form a resonant circuit therewith, and means at said ends of said body for closing said slot.

8. A transducer comprising an elongated body of electrically insulating material, said body being formed with a through opening spaced from opposite ends of said body and passing through the axis of said body, said body being formed with an axially aligned slot passing through at least one of said ends and communicating with said through opening, a coil fixed within said slot and disposed coaxially with said opening, a core of magnetic material fixed within said coil, a pair of slabs of magnetic material, a separate resilient diaphragm having a center portion fixed to each of said slabs of said pair, each of said resilient diaphragms having a periphery sealed to said body and forming a closed chamber therebetween, said resilient diaphragms supporting said slabs substantially parallel to each other on opposite sides of said core, means fixing a separate diaphragm to said body to cover opposite ends of said through opening, a capacitor within said slot and connected across said coil, and means fixed to said body at at least one of said ends for closing said slot.

References Cited in the file of this patent

UNITED STATES PATENTS

| | | |
|---|---|---|
| 1,718,494 | Schurig | June 25, 1929 |
| 2,368,278 | Warsaw | Jan. 30, 1945 |
| 2,525,587 | Cahn | Oct. 10, 1950 |
| 2,583,941 | Gordon | Jan. 29, 1952 |
| 2,829,520 | Stanton | Apr. 8, 1958 |